United States Patent [19]
Imbertson

[11] Patent Number: 5,245,520
[45] Date of Patent: Sep. 14, 1993

[54] ASYMMETRICAL DUTY CYCLE POWER CONVERTER

[76] Inventor: Paul Imbertson, 9525 Rich Valley Blvd., Inver Grove Heights, Minn. 55077

[21] Appl. No.: 774,332

[22] Filed: Oct. 10, 1991

[51] Int. Cl.$^5$ .................................... H02M 3/335
[52] U.S. Cl. .......................... 363/17; 363/56; 363/98; 363/132
[58] Field of Search .............. 363/17, 56, 98, 132, 363/24, 25, 95, 97, 124, 131, 133, 134

[56] References Cited
U.S. PATENT DOCUMENTS

| | | | |
|---|---|---|---|
| 4,276,588 | 6/1981 | McLyman et al. | 363/56 |
| 4,855,888 | 8/1989 | Henze et al. | 363/17 |
| 4,864,479 | 9/1989 | Steigerwald et al. | 363/17 |
| 5,132,889 | 7/1992 | Hitchcock et al. | 363/17 |
| 5,159,541 | 10/1992 | Jain | 363/26 |

Primary Examiner—Steven L. Stephan
Assistant Examiner—Adolf Berhane
Attorney, Agent, or Firm—Hugh D. Jaeger

[57] ABSTRACT

Operating a bridge type PWM switch mode power converter with asymmetrical duty ratios can eliminate switching losses with no increase in conduction loss. Included are three circuits, a full bridge buck converter, a half bridge buck converter, and a full bridge boost converter. These converters are an improvement over existing zero switching loss converter circuits in that they eliminate the large peak switch currents and voltages typical of existing circuits. The peak switch voltages found in these circuits are as low as those seen in standard PWM switch mode converters, and allow the use of efficient low voltage switches. The low peak and rms current delivered by the switches further improves efficiency, and the elimination of switching losses increases efficiency and allows operation at higher frequencies with the resultant benefit of smaller component size.

20 Claims, 7 Drawing Sheets

ASYMMETRICAL DUTY CYCLE POWER CONVERTER

BACKGROUND OF THE INVENTION

1. Field of the Invention

The field of the present invention pertains to power converters, and more particularly, pertains to asymmetrical duty cycle DC to DC power converters.

2. Description of the Prior Art

Prior art includes various electronic power converter circuits used for voltage regulation, DC-DC or DC-AC voltage conversion, and power conditioning. High efficiency, as dictated by conduction losses and switching losses, is usually one of the primary goals of these circuits, and various approaches are used to increase the efficiency of these converters.

Existing technologies in this field include switch-mode, resonant, quasi-resonant, and phase shift resonant converters. Of these, switch-node converters have the lowest conduction losses, but suffer from high switching losses. The other converters, through one means or another, eliminate the switching losses, but in each case it is at the expense of higher conduction loss.

SUMMARY OF THE INVENTION

The general purpose of the present invention is an asymmetrical duty cycle power converter that provides notable advantages over existing technologies. The power converters are able to eliminate switching losses, lower input current pulsation and maintain low conduction losses.

In switch-mode converter circuits it is usual for the power switches to be in a conducting state for an equal duration during each half of the switching period. With two legs, alternately one leg then the other would conduct during successive half periods for the same length of time with a corresponding deadtime between each conduction time period. The new asymmetrical converter circuits differ from these circuits in that the legs conduct for unequal lengths of time with only a small, well controlled deadtime between them. This small deadtime is designed to allow completely lossless commutation of the power switches, while the variable conduction times allow the converters to regulate. Also, the nature of these conduction periods is such that the asymmetrical converter circuit's conduction losses are no greater than those of switch-mode converter circuits.

With existing technologies the usual tradeoff is low conduction loss versus low switching loss, with switch-mode converters having the lowest conduction loss but high switching loss, and the other converter circuits cited as prior art having zero switching loss but higher conduction loss. The new asymmetrical converter circuits eliminate this tradeoff by combining zero switching loss with the same low conduction loss enjoyed by switch-mode converters.

A. Asymmetric Duty Cycle

1) What is Asymmetric Duty Cycle?: To understand the operation of these circuits, imagine a standard PWM, transformer coupled, bridge type converter (known perhaps as a quasi-square wave converter). Initially the converter is operating at a 50% duty cycle with only enough deadtime to allow voltage commutation of the switches. With enough current, and proper timing, this circuit can switch losslessly, with the transformer leakage inductance, or a separate commutating inductance, providing an inductive kick to swing the switch voltages. If the amplitude of this voltage "ring" is large enough, precise switch turn-on timing can exploit it to effect a lossless switching transition.

Next, lower the duty cycle of this imaginary converter to 40%. Lossless switching is immediately lost since the switch voltages will not be at the required zero volts when they are turned on. To regain lossless switching, leave one of the legs at the 40% duty cycle while increasing the opposite leg to a 60% duty cycle. Now the switches are again able to exploit the inductive turn-off "ring" to gain lossless switching. This unequal duty cycle operation gives these circuits their name and allows the circuits to switch losslessly.

This immediately posses serious operational difficulties, primarily the volt-second balance of the power transformer and whether regulation is possible, but these problems are solvable and are addressed in the design equation section.

2) Advantage of Asymmetrical Circuit: It is understandable at this point to ask what possible reason there could be for going through such a seemingly awkward and convoluted exercise to attain lossless switching. After all, lossless switching can be achieved by any number of more straight forward means. The answer is that these converters, with their strange duty cycles, can also achieve low switch conduction losses, as low as PWM circuits, long regarded as benchmark circuits with the lowest possible conduction losses.

B. COMPARISONS

Any converter topology must compare favorably with the standard converter circuits currently being employed if it is to warrant any investigation beyond the level of simple curiosity. In addition, such a comparison helps to define the converter's possible role in power conversion.

1) Switch Mode Converter: PWM switch mode converters have the lowest conduction losses of all the converter circuits; in fact, some would argue that it is futile to spend any time searching for a new circuit which would have lower conduction losses. On the down side, PWM converters are "hard switch" circuits, suffering from high switching losses which limit their usefulness at high frequencies.

2) Resonant Converter: The undesirable switching losses of switch mode converters lead designers to the resonant class of converters which eliminate switching losses, opening the door to higher frequencies and physically smaller converters. However, these converters pay a heavy price in high conduction loss and large peak currents and voltages.

3) Resonant Pole Converter: Resonant pole or phase shift converters also switch losslessly, and their operation seems in many respects to mimic switch mode converters. But, the one feature they do not mimic is the low conduction loss of switch mode converters. This fact is an undesirable result of the freewheeling idle current which is required to flow in the primary side circuit during the deadtime between conduction intervals.

4) Asymmetric Duty Cycle Converter: The asymmetric duty cycle converters combine the best features of these circuits. Their conduction losses are as low as switch mode circuits and they switch losslessly like resonant circuits. To be perfectly honest, timing difficulties can limit their maximum frequency to something less than true resonant circuits, and the boundary condition requirements for lossless switching are somewhat more restrictive than for resonant pole converters. But, in many cases these drawbacks are easy to swallow in exchange for the benefit of low conduction loss and the elimination of switching loss.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

II. Circuit Description & Design

Asymmetric duty cycle is a general technique which can be manifest in several forms. The two forms shown here are both duty cycle regulated, switch losslessly, and have the same low conduction losses as the PWM circuits from which they were derived. The operation of each circuit will become clear as the design equations are introduced.

A. Circuits

Figure 1:
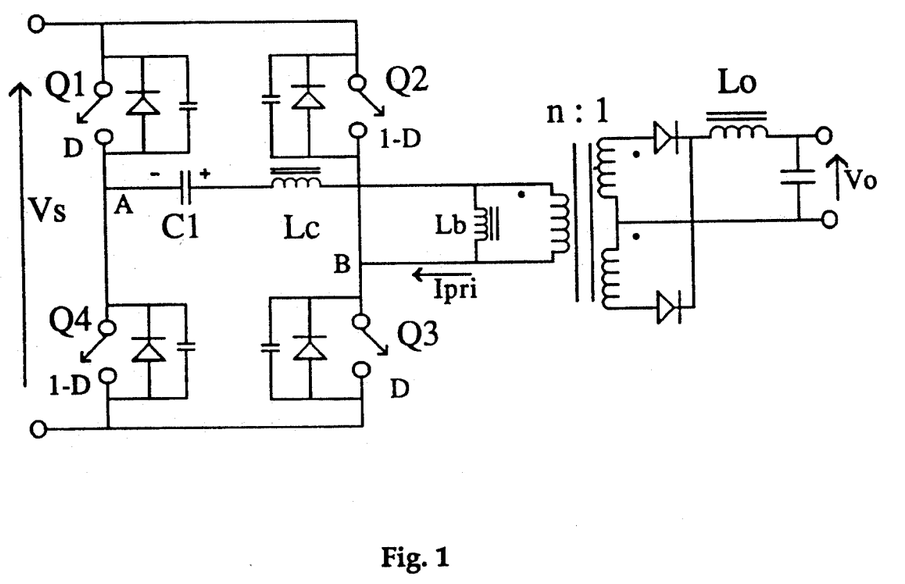
FIG. 1 illustrates a circuit schematic of a full bridge asymmetrical buck converter.
Figure 2:
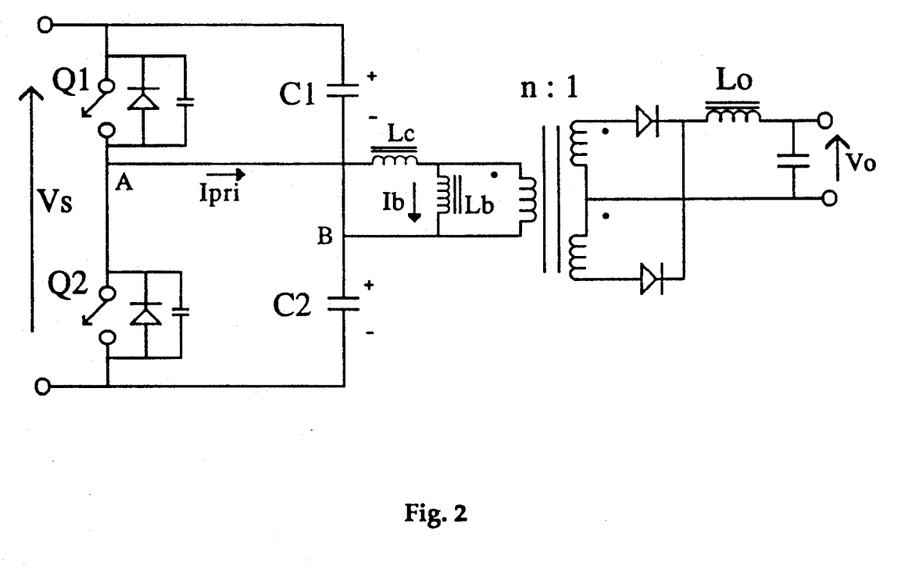
FIG. 2 illustrates a circuit schematic of a half bridge asymmetrical buck converter.
Figure 3A:
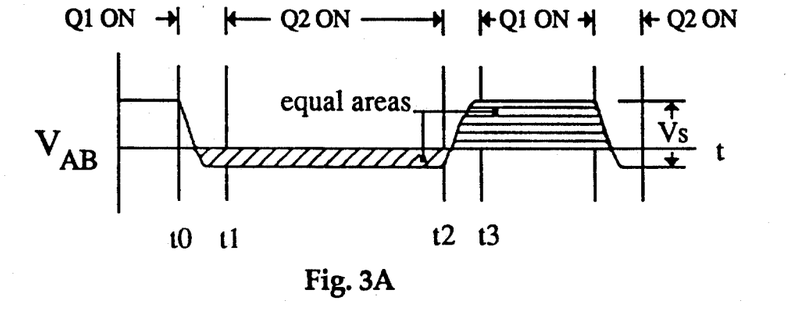
FIGS. 3A and 3B illustrate circuit wave forms of a half bridge asymmetrical buck converter.
Figure 3B:
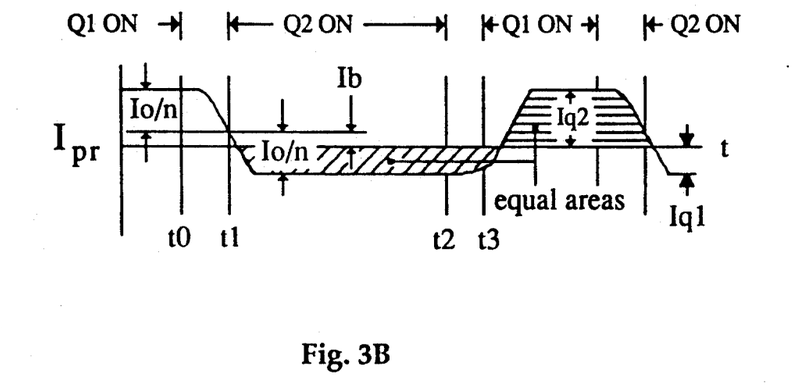

An asymmetric full bridge buck (step-down) circuit is shown in FIG. 1, its half bridge counterpart is shown in FIG. 2 along with its major waveforms in FIG. 3.

1) Lossless Switching: The process of lossless switching can be best understood by referring to FIGS. 2 and 3. At $t_0$, Q1 is turned off and the current which had been flowing through Q1 now flows through the parasitic capacitances, shown here as lumped capacitances across each transistor. This current charges the upper parasitic capacitance and discharges the lower parasitic capacitance, driving the voltage $V_{AB}$ towards zero. $V_{AB}$ continues to fall after reaching zero as $L_c$ releases its stored energy to continue charging and discharging the parasitic capacitances. When $V_{AB}$ reaches its lowest point, Q2's antiparallel diode begins to conduct, clamping $V_{AB}$ at the point, and the rest of $L_c$'s stored energy is returned to the source At $t_1$ switch Q2 is turned on. This point is timed to occur while Q2's antiparallel diode is conducting, guaranteeing that Q2 will be turned on losslessly, since there is no voltage across it. Shortly after $t_1$, the primary current reverses polarity and Q2 begins to conduct current in the positive sense, soon reaching its static level where it remains until Q2 is turned off.

Times $t_2$ and $t_3$ are equivalent to $t_0$ and $t_1$ for the opposite switching interval. As before, the switching is lossless.

B. Design Equations

The equations derived below refer to the full and half bridge circuits in FIGS. 1 and 2. Since the circuits are quite similar to each other, their equations are derived concurrently.

1) Basic Equations: In the following, the odd numbered transistors, Q1 and Q3 in the full bridge circuit, Q1 in the half bridge circuit, are operating at a duty ratio of D, while the even numbered transistors, Q2 and Q4 in the full bridge, Q2 in the half bridge circuit, are operating at a duty ratio of 1-D.

a) Transformer balance: To maintain balanced volt-seconds on the power transformer's primary (graphically shown as "equal areas" in FIG. 3a), the following must be true in the full bridge circuit.

$$(V_s+V_{c1})D=(V_s-V_{c1})(1-D), \text{ so} \qquad \text{Eq.1}$$

$$V_{c1}=V_s(1-2D): \text{Full bridge}, \qquad \text{Eq.2}$$

In the half bridge circuit, $$V_{c1}D=V_{c2}(1-D) \text{ must be true}, \qquad \text{Eq.3}$$

$$\text{and since } V_{c1}+V_{c2}=V_s, \qquad \text{Eq.4}$$

$$V_{c1}=V_s(1-D), \qquad \text{Eq.5}$$

$$\text{and } V_{c2}=V_sD: \text{Half bridge}, \qquad \text{Eq.6}$$

b) Output voltage: These capacitor voltages are reflected across the transformer to the output, and along with the source voltage, $V_s$, and the duty cycle, D, determine the output voltage.

$$V_o = ((V_s + V_{c1})D + (V_s - V_{c1})(1 - D))/n: \text{Full bridge}, \qquad \text{Eq. 7}$$

$$V_o = (V_{c1}D + V_{c2}(1 - D))/n: \text{Half bridge}, \qquad \text{Eq. 8}$$

so $$V_o = \frac{4V_sD(1 - D)}{n} : \text{Full bridge}, \qquad \text{Eq. 9}$$

and $$V_o = \frac{2V_sD(1 - D)}{n} : \text{Half bridge}. \qquad \text{Eq. 10}$$

c) Transistor currents: To maintain the DC bias voltage on the input capacitors, the transistors must provide balanced amp-seconds (again, it is graphically shown as "equal areas" in FIG. 3b, therefore $$I_{q,odd}D=I_{q,even}(1-D), \qquad \text{Eq.11}$$

where these currents are the conduction state or pedestal currents (see FIG. 3b).

$$\frac{I_o}{n} = \frac{I_{q,odd} + I_{q,even}}{2} \quad \text{Eq. 12}$$

(See the section on balance current for an explanation of this equation.)

Then, since $$I_{q,even} = \frac{I_{q,odd} D}{1 - D}, \quad \text{Eq. 13}$$

$$I_{q,odd} = \frac{2 I_o (1 - D)}{n}, \quad \text{Eq. 14}$$

Similarly, $$I_{q,even} = \frac{2 I_o D}{n}. \quad \text{Eq. 15}$$

The rms transistor currents are simply, $$rms I_{q,odd} = I_{q,odd} \sqrt{D} = \frac{2 I_o (1 - D) \sqrt{D}}{n}, \quad \text{Eq. 16}$$

and $$rms I_{q,even} = I_{q,even} \sqrt{1 - D} = \frac{2 I_o D \sqrt{1 - D}}{n} \quad \text{Eq. 17}$$

d) Balance current: These equations show that the odd transistor currents do not equal the even transistor currents. This is true even though the reflected load, which is controlled by $L_o$, is the same for both the even and the odd legs. This discrepancy is eliminated by the introduction of a steady, unidirectional current flowing through $L_b$ (the "b" stands for balance) which diverts bridge current from reaching the load when the odd leg is conducting and adds to the bridge current delivered to the load when the even leg is conducting, so that the same current is delivered to the load in each case. Therefore, $$I_{q,odd} - I_{Lb} = I_{q,even} + I_{Lb} = \frac{I_o}{n}, \quad \text{Eq. 18}$$

so $$\frac{I_o}{n} = \frac{I_{q,odd} + I_{q,even}}{2}, \quad \text{Eq. 19}$$

and $$I_{Lb} = \frac{I_{q,odd} - I_{q,even}}{2}. \quad \text{Eq. 20}$$

2) Boundary conditions: The asymmetric circuit relies on the energy in the commutating inductor, $L_c$, to charge and discharge the parasitic switch capacitances, much as in a resonant pole converter. And, just as in the resonant pole converter, at low current levels the commutating inductor may not have enough stored energy to guarantee a lossless transition.

The boundary between lossless and lossy switching depends on the parasitic capacitances, the commutating inductance, and the load resistance. To understand this relationship, first, realize that the commutating inductance and the parasitic capacitances interact during this interval just like a pure LC resonant tank circuit. At the beginning of the interval the LC circuit has energy stored in its inductance; at the end of the interval, this energy has been transfered to the parasitic capacitances. If the inductor energy is great enough to completely charge the parasitic capacitor voltages to the proper input supply rail, then the circuit can manage a lossless switching (any extra energy is delivered back to the source). If the inductor energy is not great enough, the parasitic capacitances will never reach their destination rail and lossless switching will not be possible.

The first part of the switching interval comes free as the transformer primary voltage collapses to zero. From then on, the parasitic capacitances rely on the energy in the commutating inductance to charge or discharge them to their proper levels. Equating the energy stored in the commutating inductance at the beginning of this interval with the energy required by the parasitic capacitances at the end of the switching interval determines the boundary condition between lossless and lossy switching.

Assuming the odd transistors operate at duty cycle D, which ranges from zero to one-half, the most difficult switching interval occurs when the even transistors are turning off. During that interval, the commutating inductance has the least energy initially stored in it (since $I_{q,even} < I_{q,odd}$), and must charge the effective capacitance to the largest level (since $V_{c1} > V_{c2}$: half bridge, or $V_s + V_{c1} > V_s - V_{c1}$: full bridge.)

The energy stored in the commutating inductance at the start of this switching interval is, $$W_{Lc} = \tfrac{1}{2} L_c I_{q,even}^2, \quad \text{Eq. 21}$$

At the end of the switching interval, the LC circuit contains the same energy but now it is stored in the effective capacitance.

$$W_{Ce} = \tfrac{1}{2} C_e V_{c1}^2 : \text{Half bridge}, \quad \text{Eq. 22}$$

and $$W_{Ce} = \tfrac{1}{2} C_e (V_s + V_{c1}) \text{Full bridge} \quad \text{Eq. 23}$$

(The effective capacitance $C_e$ is simply the parallel combination of all the parasitic switch capacitances for the half bridge circuit, or one-half this value for the full bridge circuit).

Equating $W_{Lc}$ with $W_{Ce}$ gives, $$L_c I_{q,even}^2 = C_e V_{c1}^2 : \text{Half bridge}, \quad \text{Eq. 24}$$

and $$L_c I_{q,even}^2 = C_e \left( \frac{V_s + V_{c1}}{2} \right)^2 : \text{Full bridge}. \quad \text{Eq. 25}$$

Recalling the equations for $I_{q,even}$, $V_{c1}$ and $V_o$, along with a little algebra gives, $$I_{o,boundary} = \frac{V_o n^2}{4D^2} \sqrt{\frac{C_e}{L_c}} : \text{Half bridge}, \quad \text{Eq. 26}$$

and $$I_{o,boundary} = \frac{V_o n^2}{4D^2} \sqrt{\frac{C_e}{L_c}} : \text{Full bridge}. \quad \text{Eq. 27}$$

Assuming constant output voltage, $$\min D = \frac{1}{2}\left(1 - \sqrt{1 - \frac{\min V_s}{\max V_s}}\right), \quad \text{Eq. 28}$$

so these equations can be rewritten without D, as $$R_{ld,boundary} = \quad \text{Eq. 29}$$

$$\frac{1}{n^2} \sqrt{\frac{L_c}{C_e}} \left(1 - \sqrt{\frac{\min V_s}{\max V_s}}\right)^2 : \text{Half bridge,}$$

and $$R_{ld,boundary} = \quad \text{Eq. 30}$$

$$\frac{1}{n^2} \sqrt{\frac{L_c}{C_e}} \left(1 - \sqrt{\frac{\min V_s}{\max V_s}}\right)^2 : \text{Full bridge.}$$

Satisfying these equations fulfills the requirements for lossless switching, and determines the zero switching loss boundary condition.

III. SELECTED FEATURES

A. EMI Reduction

The input current which is drawn by buck (step down) type converters is a series of squared pulses. In switch mode converters these are equal pulses, equally spaced, becoming narrower as the duty cycle is decreased. In the asymmetric circuits, these pulses are unequal in amplitude and duration with no appreciable deadtime between them. In almost all applications, it is important to buffer the source from these pulses with a low pass EMI filter.

At 50% duty cycle, these pulses merge into a nearly ideal smooth DC, but at the nominal operating duty cycle (which could seldom be 50%) these pulses present a serious concern. Assuming that the pulses cannot be eliminated under all conditions, the next best hope would be that the pulses could merge into DC at the nominal operating duty cycle, rather than at 50%. The input current would then normally be DC, deviating from that ideal by the smallest possible margin as the converter modulates the duty cycle above and below the nominal duty cycle. This hoped for condition is possible with the asymmetric half bridge buck circuit, as an example will show.

Figure 4:
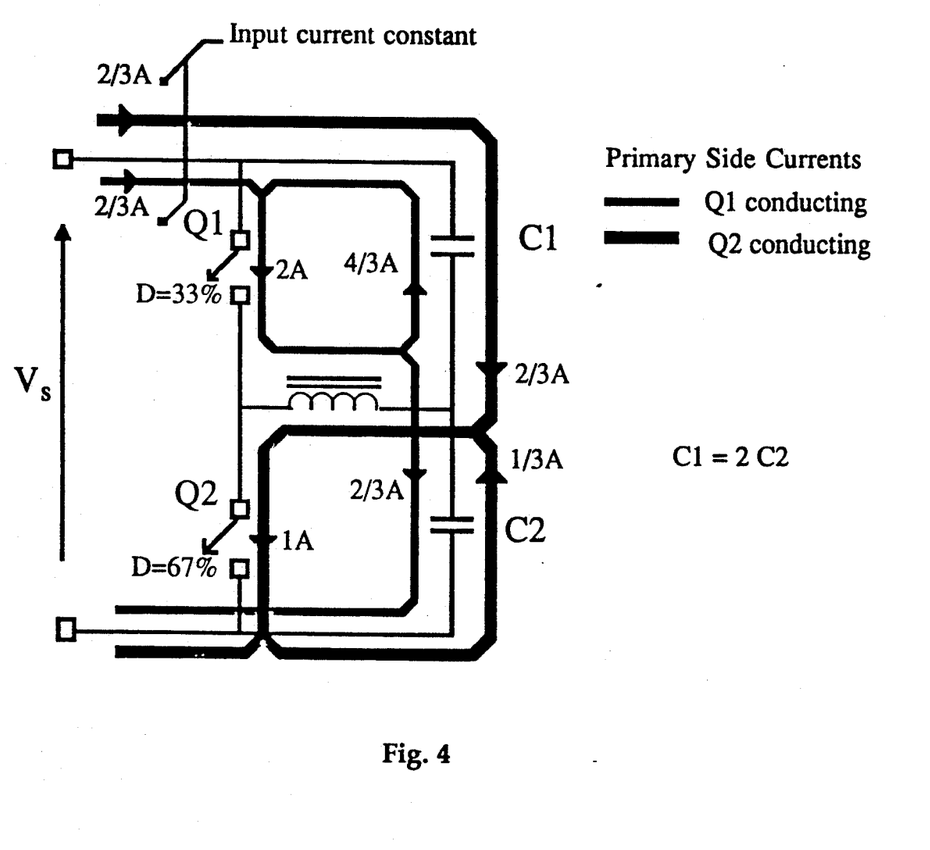
FIG. 4 illustrates a circuit schematic of a half bridge asymmetrical buck converter with unequal bridge capacitors which lowers input EMI.
Figure 5:
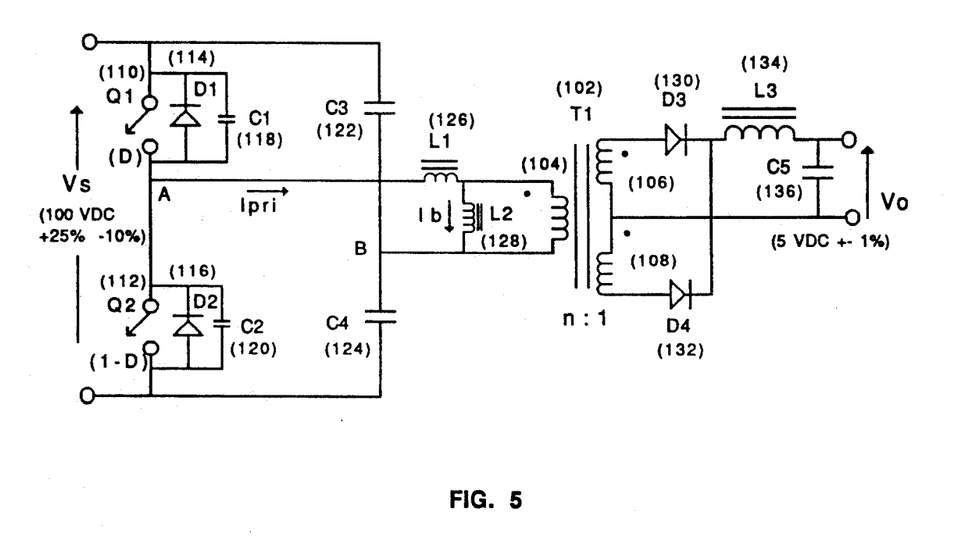
FIG. 5 illustrates a circuit schematic of a half bridge asymmetric buck converter with typical application of 100 vdc unregulated to 5 vdc regulated voltage conversion for computer logic circuits.

A converter front end, designed for a nominal duty cycle of 33% is shown in FIG. 4. Capacitors C1 and C2 are unequal, and therefore share the transistor current unequally, such that the total voltage across them remains constant. Assuming the source current is ⅔ amperes, Q1 delivers 2 amperes to the capacitor bridge which is split two to one by the capacitors. C1 is discharged by a current of 4/3 amperes and C2 is charged by a current of ⅔ amperes. Since Q2 is not conducting, this ⅔ amperes is exactly the source current.

When Q2 is conducting, it delivers one ampere which is again split two to one by the capacitor bridge, C1 being charged by a ⅔ ampere current and C2 being discharged by a ⅓ ampere current. The source current is again ⅔ amperes, so, at this duty cycle, the input current is a nearly pure DC, being adulterated only by the small commutation times between conduction intervals.

As the duty cycle is modulated above and below 33%, the input current will slowly deviate from this ideal DC, But never as far as it would if C1 and C2 were not adjusted for DC input current at 33%. C1 and C2 can be adjusted to create a steady DC input current at any required duty cycle.

B. Transistor Conduction Losses

At any duty cycle other than 50%, the odd transistor's conduction losses will not equal the even transistor's conduction losses, which complicates comparisons to other circuits, but the item of interest is actually the total transistor conduction losses, which simplifies these comparisons.

1) Asymmetric circuit: Recall from the equation section, $$rmsI_{q,odd} = \frac{2I_o}{n}(1-D)\sqrt{D}, \quad \text{Eq. 31}$$

and $$rmsI_{q,even} = \frac{2I_o}{n}D\sqrt{1-D}. \quad \text{Eq. 32}$$

The total losses are proportional to the sum of the squares of these rms currents, which is the square of the primary side rms current (including the balance inductor current), rmsIpri.

$$rmsI_{pri} = \sqrt{I_{qodd}^2 D + I_{qeven}^2 (1-D)} \quad \text{Eq. 33}$$

$$rmsI_{pri} = \frac{2I_o}{n}\sqrt{D(1-D)}. \quad \text{Eq. 34}$$

Assuming constant output voltage, $$\frac{\min V_s}{V_s} = 4D(1-D), \quad \text{Eq. 35}$$

so $$rmsI_{pri} = \frac{I_o}{n}\sqrt{\frac{\min V_s}{V_s}} : \text{Asymmetrical circuit} \quad \text{Eq. 36}$$

2) Switch mode circuit: In the conventional switch mode circuit, $$rmsI_{pri} = \frac{I_o}{n}\sqrt{2D}, \quad \text{Eq. 37}$$

and, again assuming constant output voltage, $$\frac{\min V_s}{V_s} = 2D, \quad \text{Eq. 38}$$

so $$rmsI_{pri} = \frac{I_o}{n}\sqrt{\frac{\min V_s}{V_s}} : \quad \text{Eq. 39}$$

Conventional switch mode circuit.

Which proves the surprising result that the transistor conduction losses of these two converter types are equivalent.

BOOST DERIVED CIRCUIT

Figure 6:
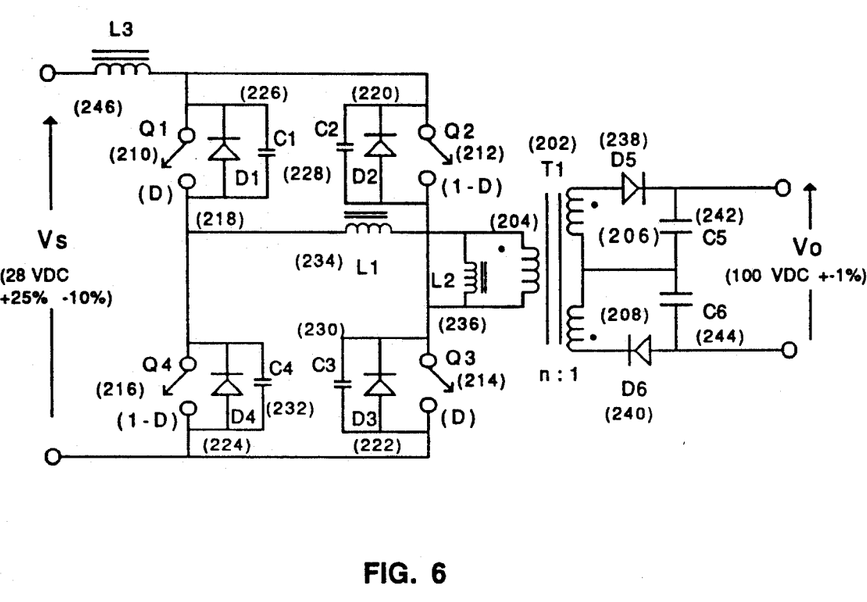
FIG. 6 illustrates a circuit schematic of a full bridge asymmetric boost converter with typical application of voltage conversion (28 vdc unregulated to 100 vdc regulated) to drive higher voltage equipment off battery power; and, FIG. 7 illustrates a circuit schematic of a full bridge asymmetric buck converter of a typical application 100 vdc unregulated to 5 vdc regulated conversion for computer logic circuits.

If the half bridge buck circuit of FIG. 2 is turned around, left to right, input to output, and the switches and diodes are interchanged, the boost (step-up) circuit shown in FIG. 6 is obtained. As in the previous circuits there is a small deadtime between conduction intervals, but it is only long enough to allow for the lossless switch transition which occurs in the same manner as in the buck circuit.

The input inductor dictates that the switches all carry the same current, however to maintain the proper bias in the output capacitors the output diodes must carry differing currents. The transformer magnetizing current (or current from a separate inductor across the transformer) provides this current difference just as in the buck derived circuits.

$$I_{D6} = I_o/D \qquad \text{Eq. 40}$$

$$I_{D5} = I_o/(1-D) \qquad \text{Eq. 41}$$

$$I_m = (I_{D6} - I_{D5})/2n = I_o/2nD(1-D) \qquad \text{Eq. 42}$$

Where $I_m$ is the transformer magnetizing current referred to the primary, or it could also be the current in a separate inductor placed across the transformer primary.

Balanced volt-second excitation must be maintained across both the input inductor and the power transformer. To accomplish this, the bridge end of the input inductor never swings all the way to ground, it instead varies from some point below $V_S$ to a point above $V_S$ during consecutive cycle intervals in such a way that both the inductor and the transformer are driven by balanced volt-seconds.

To insure equal inductor volt-seconds, $$(V_s - V_{AB1})D = -(V_s + V_{AB2})(1-D) \qquad \text{Eq. 43}$$

To insure equal transformer volt-seconds, $$V_{AB1}D = -V_{AB2}(1-D) \qquad \text{Eq. 44}$$

$$\text{Therefore, } V_{AB1} = V_s/2D \qquad \text{Eq. 45}$$

$$\text{and, } V_{AB2} = -V_s/2(1-D) \qquad \text{Eq. 46}$$

Where $V_{AB1}$ is the voltage from point A to point B when the S1–S3 pair are on, and $V_{AB2}$ is the same voltage when the S2–S4 pair are on.

The output voltage is the sum of the transformed and rectified primary voltages.

$$V_o = (V_{AB1} - V_{AB2})/n = V_s/2nD(1-D). \qquad \text{Eq. 47}$$

This is a quadratic relationship which determines the converter's regulation characteristics (minimum at D=50%, approaching infinity at D=0% or 100%).

MODE OF OPERATION

| Half Bridge Asymmetrical Buck Converter | | |
|---|---|---|
| Q1: 110 | Input bridge transistor. Operates at duty cycle D, out of step with Q2. The two transistors, Q1 and Q2, convert Vs, a DC voltage, into a square wave AC voltage which can be transferred across the power transformer, T1. Adjusting the duty cycle, D, controls the voltage conversion ratio, Vs/Vo, so that the ouput voltage, Vo, can be kept constant when the input voltage changes, or so that | |

| -continued | | |
|---|---|---|
| Half Bridge Asymmetrical Buck Converter | | |
| | the output voltage can be controlled for any application related requirement. | |
| Q2 112 | Input bridge transistor. Same function as Q1. Operates at duty cycle 1-D, out of step with Q1. | |
| D1 114 | Freewheeling or catch diode. May be discrete component, or parasitic diode associated with Q1. Conducts momentarily before Q1 begins its conduction interval. Provides path for L1 to return its stored energy to the source. | |
| D2 116 | Freewheeling or catch diode. Same form and function as D1, but associated with Q2. | |
| D3 130 | Output rectifier. Along with D6, rectifies AC output of T1, and passes the unidirectional, but not yet pure DC voltage on to the low pass output filter, L3 and C6. | |
| D4 132 | Output rectifier. Along with D5, rectifies AC output of T1, and passes the unidirectional, but not yet pure DC voltage on to the low pass output filter, L3 and C6. | |
| T1 102 | Power transformer. Transfers electrical energy from the input bridge, Q1 and Q2, to the output section (D3, D4, L3, and C6). Transforms voltage level according to turns ratio, n:1. | |
| L1 126 | Commutating inductance. Lumped inductance comprised of the leakage inductance of T1 and any additional inductance placed in series with the transformer's primary. Provides energy to charge and discharge the required capacitances during a switching interval. Along with those capacitances, L1 forms an LC resonant tank circuit, allowing the input switches, Q1 and Q2, to resonantly, and therefore losslessly, switch on and off. | |
| L2 128 | Balance inductor. Lumped inductance comprised of the magnetizing inductance of T1 and any additional inductance placed in parallel with the transformer's primary. Maintains proper steady state voltage across C5, by providing a steady current which adds to the load seen by Q1, and subtracts from the load seen by Q2. In this way, C5 will be alternately charged and discharged by equivalent electrical charges.<br>\|q\|*D = \|q2*(1-D).<br>\|q\| = reflected load current + current through L2.<br>\|q2\| = reflected load current − current through L2. | |
| L3 134 | Ouput inductor. Inductive part of output low pass filter. Along with C5, smooths and filters the rectified square edged pulses delivered by the ouput rectifiers, D3 and D4. | |
| C1 118 | Switch capacitance. Lumped capacitance comprised of all parasitic capacitance associated with Q1 and D1, as well as any additional capacitance connected to Q1. C1 and C2, along with L1, form an LC resonant tank circuit which allows the input switches, Q1 and Q2, to resonantly, and therefore losslessly, switch on and off. It is the energy in these switch capacitances which would ordinarily be lost in a converter not achieving lossless switching. | |
| C2 120 | Switch capacitance. Same function as C1, but associated with Q2 and D2. | |
| C3 122 | Balance capacitor. Guarantees that the power transformer, T1, will be driven by equal and opposite volt-seconds so that transformer saturation might be avoided. Divides the input voltage, Vs, unevenly with C4 so that the voltage impressed across the power transformer's primary when the Q1 is conducting does not equal the voltage impressed when the Q2 is conducting. In that way, the volt-second product driving the power transformer will be balanced. | |
| C4 124 | Balance capacitor. Same function as C3. | |
| C5 136 | Ouput capacitor. Capacitive part of output low pass filter. Along with L3, smooths and filters the rectified square edged pulses delivered by the output rectifiers, D3 and D4. | |

| Full Bridge Asymmetrical Boost Converter | | |
|---|---|---|
| Q1: 210 | Input bridge transistor. Operates in step with Q3 at duty cycle D, and out of step with Qs 2 and 4. The four transistors, Q1–Q4, convert Vs, a DC voltage, into a square wave AC voltage which can be transfered across the power transformer, T1. Adjusting the duty cycle, D, | |

-continued

| | Full Bridge Asymmetrical Boost Converter |
|---|---|
| | controls the voltage conversion ratio, Vs/Vo, so that the output voltage, Vo, can be kept constant when the input voltage changes, or so that the output voltage can be controlled for any application related requirement. |
| Q2 212 | Input bridge transistor. Same function as Q1. Operates in step with Q4 at duty cycle 1-D, and out of step with Qs 1 and 3. |
| Q3 214 | Input bridge transistor. Same function as Q1. Operates in step with Q1 at duty cycle D, and out of step with Qs 2 and 4 |
| Q4 216 | Input bridge transistor. Same function as Q1. Operates in step with Q2 at duty cycled 1-D, and out of step with Qs 1 and 3. |
| D1 218 | Freewheeling or catch diode. May be discrete component, or parasitic diode associated with Q1. Conducts momentarily before Q1 begins its conduction interval. Provides path for L1 to return its stored energy to the source. |
| D2 220 | Freewheeling or catch diode. Same form and function as D1, but associated with Q2. |
| D3 222 | Freewheeling or catch diode. Same form and function as D1, but associated with Q3. |
| D4 224 | Freewheeling or catch diode. Same form and function as D1, but associated with Q4. |
| D5 238 | Output rectifier. Along with D6, rectifies AC output of T1, and passes the unidirectional, but not yet pure DC voltage on to the low pass output filter, L3 and C6. |
| D6 240 | Output rectifier. Along with D5, rectifies AC output of T1, and passes the unidirectional, but not yet pure DC current on to the low pass output filter, C5 and C6. |
| T1 202 | Power transformer. Transfers electrical energy from the input bridge, Q1-Q4, to the output section (D5, D6, C5, and C6). Transforms voltage level according to turns ratio, n:1. |
| L1 234 | Commutating inductance. Lumped inductance comprised of the leakage inductance of T1 and any additional inductance placed in series with the transformer's primary. Provides energy to charge and discharge the required capacitances during a switching interval. Along with those capacitances, L1 forms an LC resonant tank circuit, allowing the input switches, Q1-Q4, to resonantly, and therefore losslessly, switch on and off. |
| L2 236 | Balance inductor. Lumped inductance comprised of the magnetizing inductance of T1 and any additional inductance placed in parallel with the transformer's primary. Maintains proper steady state voltage across C5 and C6, by providing a steady current which adds to the output current delivered by D6 to C6, and subtracting from the current delivered by D5 to C5. In this way, C5 and C6 will be alternately charged and discharged by equivalent electrical charges. |
| L3 246 | Input inductor. Inductive part of low pass filter which along with C5 and C6 provides smooth DC current to the output. Provides steady DC current to the input bridge (Q1-Q4). |
| C1 226 | Switch capacitance. Lumped capacitance comprised of all parasitic capacitance associated with Q1 and D1, as well as any additional capacitance connected to Q1. C1-C4, along with L1, forms an LC resonant tank circuit which allows the input switches, Q1-Q4, to resonantly, and therefore losslessly, switch on and off. It is the energy in these switch capacitances which would ordinarily be lost in a converter not achieving lossless switching. |
| C2 228 | Switch capacitance. Same function as C1, but associated with Q2 and D2. |
| C3 230 | Switch capacitance. Same function as C1, but associated with Q3 and D3. |
| C4 232 | Switch capacitance. Same function as C1, but associated with Q4 and D4. |
| C5 242 | Output capacitor. Capacitive part of low pass filter providing a steady DC voltage to the output. Also, along with C6, guarantees that the power transformer, T1, will be driven by equal and opposite volt-seconds, so that transformer saturation might be avoided, by determining the voltage that will be impressed on the power transformer when the Q1, Q3 pair are conducting. Adds to the voltage impressed across the power transformer's primary when the Q1, Q3 pair are conducting, and subtracts from that voltage when the Q2, Q4 pair ar conducting. |
| C6 244 | Ouput capacitor. Capacitive part of low pass filter providing a steady DC voltage to the output. Same function as C5 in providing volt-second balance working with the Q2, Q4 transistor pair. |

Figure 7:
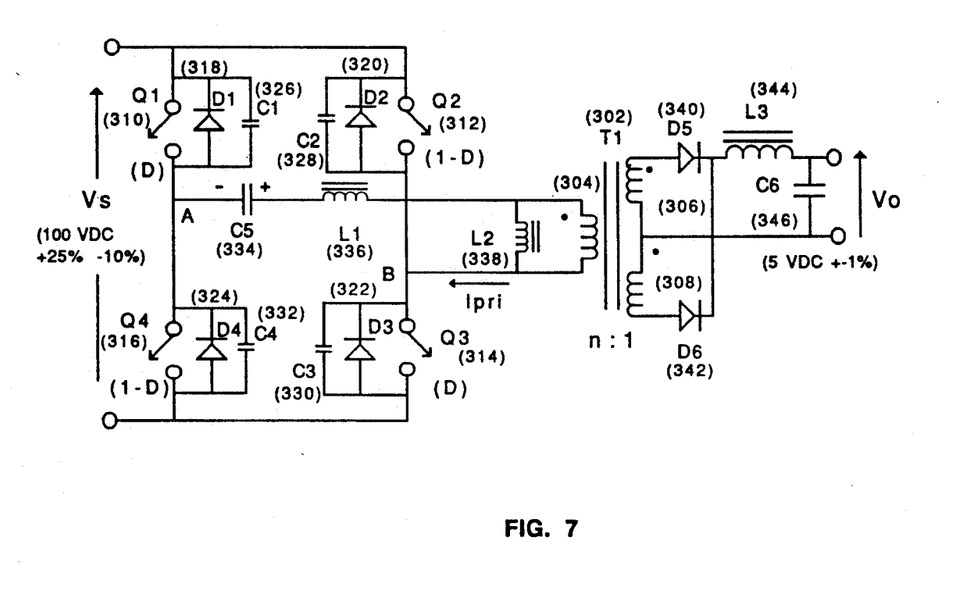

| | Full Bridge Asymmetrical Buck Converter |
|---|---|
| Q1: 310 | Input bridge transistor. Operates in step with Q3 at duty cycle D, and out of step with Qs 2 and 4. The four transistors, Q1-Q4, convert Vs, a DC voltage, into a square wave AC voltage which can be transfered across the power transformer, T1. Adjusting the duty cycle, D, controls the voltage conversion ratio, Vs/Vo, so that the output voltage, Vo, can be kept constant when the input voltage changes, or so that the output voltage can be controlled for any application related requirement. |
| Q2 312 | Input bridge transistor. Same function as Q1. Operates in step with Q4 at duty cycle 1-D, and out of step with Qs 1 and 3. |
| Q3 314 | Input bridge transistor. Same function as Q1. Operates in step with Q1 at duty cycle D, and out of step with Qs 2 and 4 |
| Q4 316 | Input bridge transistor. Same function as Q1. Operates in step with Q2 at duty cycled 1-D, and out of step with Qs 1 and 3. |
| D1 318 | Freewheeling or catch diode. May be discrete component, or parasitic diode associated with Q1. Conducts momentarily before Q1 begins its conduction interval. Provides path for L1 to return its stored energy to the source. |
| D2 320 | Freewheeling or catch diode. Same form and function as D1, but associated with Q2. |
| D3 322 | Freewheeling or catch diode. Same form and function as D1, but associated with Q3. |
| D4 324 | Freewheeling or catch diode. Same form and function as D1, but associated with Q4. |
| D5 340 | Output rectifier. Along with D6, rectifies AC output of T1, and passes the unidirectional, but not yet pure DC voltage on to the low pass output filter, L3 and C6. |
| D6 342 | Output rectifier. Along with D5, rectifies AC output of T1, and passes the unidirectional, but not yet pure DC current on to the low pass output filter, C5 and C6. |
| T1 302 | Power transformer. Transfers electrical energy from the input bridge, Q1-Q4, to the output section (D5, D6, L3, and C6). Transforms voltage level according to turns ratio, n:1. |
| L1 336 | Commutating inductance. Lumped inductance comprised of the leakage inductance of T1 and any additional inductance placed in series with the transformer's primary. Provides energy to charge and discharge the required capacitances during a switching interval. Along with those capacitances, L1 forms an LC resonant tank circuit, allowing the input switches, Q1-Q4, to resonantly, and therefore losslessly, switch on and off. |
| L2 338 | Balance inductor. Lumped inductance comprised of the magnetizing inductance of T1 and any additional inductance placed in parallel with the transformer's primary. Maintains proper steady state voltage across C5, by providing a steady current which adds to the load seen by Q1 and Q3, and subtracts from the load seen by Q2 and Q4. In this way, C5 will be alternately charged and discharged by equivalent electrical charges. $\|q1\|^*D = \|q2\|^*(1-D)$. $\|q1\|$ = reflected load current + current through L2. $\|q2\|$ = reflected load current − current through L2. |
| L3 344 | Output inductor. Inductive part of output low pass filter. Along with C6, smooths and filters the rectified square edged pulses delivered by the output rectifiers, D5 and D6. |
| C1 326 | Switch capacitance. Lumped capacitance comprised of all parasitic capacitance associated with Q1 and D1, as well as any additional capacitance connected to Q1. C1-C4, along with L1, forms an LC resonant tank circuit which allows the input switches, Q1-Q4, to resonantly, and therefore losslessly, switch on and off. It is the energy in these switch |

-continued

Full Bridge Asymmetrical Buck Converter

| | | |
|---|---|---|
| | capacitances which would ordinarily be lost in a converter not achieving lossless switching. | |
| C2 328 | Switch capacitance. Same function as C1, but associated with Q2 and D2. | |
| C3 330 | Switch capacitance. Same function as C1, but associated with Q3 and D3. | |
| C4 332 | Switch capacitance. Same function as C1, but associated with Q4 and D4. | |
| C5 334 | Balance capacitor. Guarantees that the power transformer, T1, will be driven by equal and opposite volt-seconds so that transformer saturation might be avoided. Adds to the voltage impressed across the power transformer's primary when the Q1, Q3 pair are conducting, and subtracts from that voltage when the Q2, Q4 pair are conducting. | |
| C6 344 | Output capacitor. Inductive part of output low pass filter. Along with L3, smooths and filters the rectified square edged pulses delivered by the output rectifiers, D5 and D6. | |

The key to the advantages made possible by these asymmetric circuits is that the dead time between transistor conduction periods is very small. The transistors hand off the job or delivering energy to the load quickly and easily, thereby securing all the advantages of an unregulated square wave converter operating at a 50% duty cycle, including zero switching loss, low conduction losses, and input currents which are nearer to pure DC. The use of asymmetrical duty cycles allow these benefits to be extended to a regulating converter.

Various modifications can be made to the present invention without departing from the apparent scope hereof.

I claim:

1. A half bridge asymmetrical buck converter comprising:
   a. an input bridge transistor, Q1, its controlled terminal connected to one of input supply rails, its controlling terminal connected to a controller driving it at duty cycle D, and its common terminal connected to the controlled terminal of a lower bridge transistor Q2, forming a bridge center point;
   b. the additional bridge transistor, Q2, its controlled terminal connected to the bridge center point, its controlling terminal connected to the same controller but driven at duty cycle 1-D, and its common terminal connected to the other input supply rail;
   c. a freewheeling or catch diode, D1, connected anti-parallel across transistor Q1 to conduct reverse current around that transistor;
   d. an additional freewheeling or catch diode, D2, connected anti-parallel across transistor Q2 to conduct reverse current around that transistor;
   e. an output rectifier, D3, connected in series between one phase of the power transformer secondary and an output inductor;
   f. an additional output rectifier, D4, connected between the other phase of the power transformer secondary and the same terminal of the output inductor, so that D3 and D4 together form a typical center-tap rectification circuit;
   g. a power transformer, T1, having a single primary winding and a center-tapped secondary winding with a determined turns ratio, one terminal of the primary connected to a commutating inductance, the other terminal of the primary connected to the center-point of a balance capacitors, one phase of the secondary connected to the output rectifier D3, the other phase of the secondary connected to the output rectifier D4, and the center-tap terminal of the secondary connected to one of the output rails;
   h. The commutating inductance, L1, connected in series between the transistor bridge center point and the power transformer primary, carrying current during conduction of either Q1 and Q2 and storing energy to be released during the switching interval in the charging and discharging of a switch capacitances for lossless switching; .
   i. The balance inductor, L2, connected in parallel with the power transformer primary, supplying a steady DC current to balance capacitors to maintain steady-state charge balance;
   j. an output inductor, L3, the inductive part of a low pass filter which concerts the square-wave output of the power transformer to a steady DC, it is connected in series between the output rectifier's common point and an output capacitor;
   k. The switch capacitance, C1, connected across, or integral to, transistor Q1;
   l. an additional switch capacitance, C2, connected across, or integral to, transistor Q2, said switch capacitance C1 and C2 holding the electrical charge which must be handled by the commutating inductance during switching;
   m. the balance capacitor, C3, connected between one rail of the input supply and the power transformer primary;
   n. an additional balance capacitor, C4, connected between the power transformer primary and the other rail of the input supply, the balance capacitors apply the unbalanced voltage to the power transformer primary which is needed to counter the effect of the unbalanced duty cycles of transistor Q1 and Q2 so that the transformer is driven by equal but opposite volt-seconds during consecutive conduction intervals; and,
   o. The output capacitor, C5, the capacitive part of the low pass filter, connected across the output voltage.

2. The converter of claim 1 comprising converts DC to DC voltage.

3. The converter of claim 1 comprising regulates the output voltage.

4. The converter of claim 1 comprising eliminates switching losses.

5. The converter of claim 1 comprising exhibits lower conduction losses.

6. The converter of claim 1 comprising lower EMI on the source DC voltage.

7. A half bridge asymmetrical back converter comprising:
   a. Q1, an input bridge transistor, operating at duty cycle D, out of step with transistor Q2; two transistors, Q1 and Q2, convert Vs, a DC voltage, into a square wave AC voltage which can be transferred a across the power transformer, T1; and adjusting the duty cycle, D, controls the voltage conversion ratio, Vs/VO, so that the output voltage, Vo, can be kept constant when an input voltage changes, or so that the output voltage can be controlled for any application related requirement;
   b. Q2, input bridge transistor, with the same function as transistor Q1; and operates at duty cycle 1-D, out of step with transistor Q1;
   c. D1, freewheeling or catch diode, may be discrete component, or parasitic diode associated with transistor Q1; conducts momentarily before transistor Q1 begins its conduction interval; and provides path for inductor L1 to return its stored energy to the source;

d. D2, freewheeling or catch diode, with the same form and function as diode D1, and associated with transistor Q2;

e. D3, output rectifier, along with diode D4, rectifies AC output of powertransformer T1, and passes the unidirectional and not yet pure DC voltage onto the low pass output filter, inductor L3 and capacitor C5;

f. D4, output rectifier, along with D3, rectifies AC output of power transformer T1, and passes the unidirectional and not yet pure DC voltage onto the low pass output filter, inductor L3 and capacitor C5;

g. T1, power transformer, transfers electrical energy from the input bridge, transistors Q1 and Q2, to the output section, diodes D3, and D4, inductor L3, and capacitor C5 and transforms voltage level according to turns ratio, n:1;

L1, commutating inductance, lumped inductance comprised of the leakage inductance of power transformer
T1 and any additional inductance placed in series with the transformer's primary; provides energy to charge and discharge the required capacitances during a switching interval; and along with those capacitances, inductor L1 forms an LC resonant tank circuit, allowing the input switches, transistors Q1 and Q2, to resonantly, and therefore losslessly, switch on and off;

i. L2, balance inductor, lumped inductance comprised of the magnetizing inductance of power transformer T1 and any additional inductance placed in parallel with the transformer's primary; maintains proper steady state voltage across capacitors C3 and C4, by providing a steady current which adds to the load seen by transistor Q1, and subtracts from the load seen by transistor Q2; and in this way, capacitors C3 and C4 will be alternately charged and discharged by equivalent electrical charges, including:

$$1q1*D = 1q2*(1-D);$$

1q1 = reflected load current + current through inductor L2;
1q2 = reflected load current − current through inductor L2 j. L3, output inductor, inductive part of output low pass filter; and along with capacitor C5, smooths and filters the rectified square edged pulses delivered by the output rectifiers, diodes D3 and D4;

k. C1, switch capacitance, lumped capacitance comprised of all parasitic capacitance associated with transistor Q1 and diode D1, as well as any additional capacitance connected to transistor Q1; capacitor C1 and capacitor C2, along with inductor L1, form an LC resonant tank circuit which allows the input switches, transistors Q1 and Q2, to resonantly, and therefore losslessly, switch on and off; and it is the energy in these switch capacitance which would ordinarily be lost in a converter not achieving lossless switching;

l. C2, switch capacitance, with the same function as capacitor C1, and associated with transistor Q2 and diode D2;

m. C3, balance capacitor, guarantees that the power transformer, T1, will be driven by equal and opposite volt-seconds so that transformer saturation might be avoided; divides the input voltage, Vs, unevenly with capacitor C4 so that the voltage impressed across the power transformer's primary when the transistor Q1 is conducting does not equal the voltage impresses when the transistor Q2 is conducting; and in that way, the volt-second product driving the power transformer will be balanced;

n. C4, balance capacitor, with the same function as capacitor C3; and, o. C5, output capacitor, capacitive part of output low pass filter; and along with inductor L3, smooths and filters the rectified square edge pulses delivered by the output rectifiers, diodes D3 and D4.

8. A full bridge asymmetrical buck converter comprising:

a. an input bridge transistor, Q1, its controlled terminal connected to one of input supply rails, its controlling terminal connected to a controller driving it at duty cycle D, and its common terminal connected to the controlled terminal of a lower bridge transistor Q4, forming a left said bridge center point;

b. a further input bridge transistor, Q2, its controlled terminal connected to the same input supply rail as transistor Q1, its controlling terminal connected to the same controller but driven at duty cycle 1-D, and its common terminal connected to the controlled terminal of the lower bridge transistor Q3, forming a right bridge center point;

c. another input bridge transistor, Q3, its controlled terminal connected to the right bridge center point, its controlling terminal connected to the same contorller but driven at duty cycle D, and its common terminal connected to the other input supply rail;

d. an additional input bridge transistor, Q4, its controlled terminal connected to the left bridge center point, its controlling terminal connected to the same controller but driven at duty cycle 1-D, and its common terminal connected to the same input supply rail as transistor Q3;

e. a freewheeling or catch diode, D1, connected anti-parallel across transistor Q1 to conduct reverse current around that transistor;

f. an additional freewheeling or catch diode, D2, connected anti-parallel across transistor Q2 to conduct reverse current around that transistor;

g. another freewheeling or catch diode, D3, connected anti-parallel across transistor Q3 to conduct reverse current around that transistor;

h. a further freewheeling or catch diode, D4, connected anti-parallel across transistor Q4 to conduct reverse current around that transistor;

i. an output rectifier, D5, connected in series between one phase of the power transformer secondary and an output inductor;

j. an additional output rectifier, D6, connected between the other phase of the power transformer secondary and the same terminal of an output inductor, so that D3 and D4 together form a typical center-tap rectification circuit;

k. a power transformer, T1, having a single primary winding and a center-tapped secondary winding with a determined turns ratio, one terminal of thee primary connected to a commutating inductance, the other terminal of the primary connected to the right side bridge center-point, one phase of the secondary connected to the output rectifier D5, the other phase of the secondary connected to the output rectifier D6, and the center-tap terminal of the secondary connected to one of output rails;

l. a commutating inductance, L1, connected in series between a balance capacitor and the power transformer primary, carrying current during conduction of either the odd or the even numbered transistors and storing energy to be released during the switching interval in the charging and discharging of a switch capacitances to allow lossless switching;

m. a balance inductor, L2, connected in parallel with the power transformer primary, supplying a steady DC current to a balance capacitor to maintain steady state charge balance;

n. an output inductor, L3, the inductive part of the low pass filter which converts the square-wave output of the power transformer to a steady DC, it is connected in series between the output rectifier's common point and the output capacitor;

o. a switch capacitance, C1, connected across, or integral to, transistor Q1;

p. another switch capacitance, C2, connected across, or integral to transistor Q2;

q. a further switch capacitance, C3, connected across, or integral to, transistor Q3;

r. an additional switch capacitance, C4, connected across, or integral to, transistor Q4, C1 through C4 holding the electrical charge which must be handled by the commutating inductance during switching;

s. a balance capacitor, C5, connected between the left sidebridge center point and the commutating inductance, which applies unbalanced voltage to the power transformer primary which is needed to counter the effect of unbalanced duty cycles of the odd and even numbered transistors so that the transformer is driven by equal but opposite volt-seconds during consecutive conduction intervals; and, t. an output capacitance, C6, the capacitive part of the low pass filter, connected across the output voltage.

9. The converter of claim 8 comprising converts DC to DC voltage.

10. The converter of claim 8 comprising regulates the output voltage.

11. The converter of claim 8 comprising eliminates switching losses.

12. The converter of claim 8 comprising exhibits lower conduction losses.

13. The converter of claim 8 comprising lower EMI on the source DC voltage.

14. Full bridge asymmetrical buck converter comprising:

a. Q1, input bridge transistor, operating in step with transistor Q3 at duty cycle D, and out of step with transistors Q2 and Q4 four transistors, Q1–Q4, convert Vs, a DC voltage, into a square wave AC voltage which can be transferred across the power transformer, T1; and adjusting the duty cycle, D, controls a voltage conversion ratio, Vs/Vo, so that an output voltage, Vo, can be kept constant when the input voltage changes, or so that the output voltage can be controlled for any application related requirement;

b. Q2, input bridge transistors, with the same function as transistor Q1; and operates in step with transistor Q4 at duty cycle 1-D, and out of step with transistors Q1 and Q3;

c. Q3, input bridge transistor, with the same function as transistor Q1; and operates in step with transistor Q1 at duty cycle D, and out of step with transistors Q2 and Q4;

d. Q4, input bridge transistor, with the same function as transistor Q1; and operates in step with transistor Q2 at duty cycle 1-D and out of step with transistors Q1 and Q3;

e. D1, freewheeling or catch diode, may be discrete component, or parasitic diode associated with transistor Q1; conducts momentarily before transistor Q1 begins its conduction interval; and provides path for commutating inductance L1 to return its stored energy to the source;

f. D2, freewheeling or catch diode, with the same form and function as diode D1, and associated with transistor Q2;

g. D3, freewheeling or catch diode, with the same form and function as diode D1, and associated with transistor Q3;

h. D4, freewheeling catch diode, with the same form and function as diode D1, and associated with transistor Q4;

i. D5, output rectifier, along with diode D6, rectifies AC output of power transformer T1, and passes the unidirectional and not yet pure DC voltage onto the low pass output filter inductor L3 and capacitor C6;

j. D6, output rectifier, along with diode D5, rectifiers AC output of power transformer T1, and passes the unidirectional and not yet pure DC voltage onto the low pass output filter, inductor L3 and capacitor C6;

k. T1, power transformer, transfers electrical energy from the input bridge, transistors Q1–Q4, to the output section, diodes D5, and D6, inductor L3 and capacitor C6; and transformers voltage level according to turns ratio, n:1;

l. L1, commutating inductance, lumped inductance comprised of the leakage inductance of power transformer T1 and any additional inductance placed in series with the transformer's primary; provides energy to charge and discharge the required capacitances during a switching interval; and along with those capacitances, commutating inductance L1 forms an Lc resonant tank circuit, allowing the input switches, transistors Q1–Q4, to resonantly, and therefore losslessly, switch on and off;

m. L2, balance inductor, lumped inductance comprised of the magnetizing inductance of power transformer T1 and any additional inductance placed in parallel with the transformer's primary; maintains proper steady state voltage across capacitor C5, by providing a steady current which adds to the load seen by transistors Q1 and Q3, and subtracts from the load seen by transistors Q2 and Q4, and in this way, capacitor C5 will be alternately charged and discharged by equivalent electrical charges, including:

$$1q1 \cdot D = 1q2(1-D);$$

lq1 = reflected load current + current through inductor L2;

lq2 = reflected load current − current through inductor L2;

n. L3, output inductor, inductive part of output low pass filter; and along with capacitor C6, smooths and filters the rectified square edged pulses delivered by the output rectifiers, diodes D5 and D6;

o. C1, switch capacitance, lumped capacitance comprised of all parasitic capacitance associated with transistor Q1 and diode D1, as well as any additional capacitance connected to transistor Q1; capacitors C1–C4, long with commutating inductance L1, forms an LC resonant tank circuit which allows the input switches, transistors Q1-Q4, to resonantly, and therefore losslessly, switch on and off; and it is the energy in these switch capacitances which would ordinarily be lost in a converter not achieving lossless switching;

p. C2, switch capacitance, with the same function as capacitor C1, and associated with transistor Q2 and diode D2;

q. C3, switch capacitance, with the same function as capacitor C1, and associated with transistor Q2 and diode D2;

r. C4, switch capacitance, with the same function as capacitor C1, and associated with transistor Q4 and diode D4;

s. C5, balance capacitor, guarantees that the power transformer, T1, will be driven by equal and opposite volt-seconds so that transformer saturation might be avoided; and adds to the voltage impressed across the power transformer's primary when the transistors Q1, Q3 pair are conducting and subtracts from that voltage when the transistors Q2, Q4 pair are conducting; and, t. C6, output capacitor, capacitive part of output low pass filter; and along with L3, smooths and filters the rectified square edges pulses delivered by the output rectifiers, diodes D5 and D6.

15. A full bridge asymmetrical boost converter comprising:

a. an input bridge transistor, Q1, its controlled terminal connected to one side of the input supply rail, its controlling terminal connected to a controller driving it at duty cycle D, and its common terminal connected to a controlled terminal of a lower bridge transistor Q4, forming a left side bridge center point;

b. a further input bridge transistor, Q2, its controlled terminal connected to the same input supply rail as transistor Q1, its controlling terminal connected to the same controller but driven at duty cycle 1−D, and its common terminal connected to the controlled terminal of the lower bridge transistor Q3, forming a right bridge center point;

c. another input bridge transistor, Q3, its controlled terminal connected to the right bridge center point, its controlling terminal connected to the same controller but driven at duty cycle D, and its common terminal connected to the other input supply rail;

d. an additional bridge transistor, Q4, its controlled terminal connected to the left bridge center point, its controlling terminal connected to the same controller but driven at duty cycle 1−D, and its common terminal connected to the same input supply rail as transistor Q3, transistor Q1 through transistor Q4 forming a full bridge, or "H", switch network;

e. a freewheeling or catch diode, D1, connected anti-parallel across transistor Q1 to conduct reverse current around that transistor;

f. an additional freewheeling or catch diode, D2, connected anti-parallel across transistor Q2 to conduct reverse current around that transistor;

g. another freewheeling or catch diode, D3, connected anti-parallel across transistor Q3 to conduct reverse current around that transistor;

h. a further freewheeling or catch diode, D4, connected anti-parallel across transistor Q4 to conduct reverse current around that transistor;

i. an output rectifier, D5, connected between one phase of the power transformer secondary and one of the output rails;

j. a further output rectifier, D6, connected between the other phase of the power transformer secondary and the other output rail;

k. a power transformer, T1, having a single primary winding and a center-tapped secondary winding with a determined turns ratio, one terminal of the primary connected to a commutating inductance, the other terminal of the primary connected to the right side bridge center-point, one phase of the secondary connected to the output rectifier D5, the other phase of the secondary connected to the output rectifier D6, and the center-tap terminal of the secondary connected to the center tie point of the output capacitors;

l. the commutating inductance, L1, connected in series between the left side bridge center point and the power transformer primary, carrying current during conduction of either the odd or the even numbered transistors and storing energy to be released during the switching interval in the charging and discharging of a switch capacitances for lossless switching;

m. a balance inductor, L2, connected in parallel with the power transformer primary, supplying a steady DC current to the output capacitors to maintain steady-state charge balance;

n. an input inductor, L3, the inductive part of a low pass filter which converts the square-wave output of the power transformer to a steady DC output voltage, it is connected in series between one of the input supply rails and the controlled terminals of O1 and O2;

o. the switch capacitance, C1, connected across, or integral to, transistor O1;

p. an additional switch capacitance, C2, connected across, or integral to, transistor O2;

q. a further switch capacitance, C3, connected across, or integral to, transistor O3;

r. another switch capacitance, C4, connected across, or integral to, transistor O4, C1 through C4 holding the electrical charge which must e handled by the commutating inductance during switching;

s. an output capacitor, C5, part of the capacitive section of low pass filter which includes L3, connected from one rail of the output voltage to the center tap of the transformer secondary; and, t. an additional output capacitor, C6, the other part of the capacitive section of the low pass filter which includes L3, connected between the center tap of the transformer secondary and the other rail of the output voltage, the output capacitors apply the unbalanced voltages to the power transformer which are needed to counter the effect of unbalanced duty cycles of the odd and even numbered transistors so that the transformer is driven by equal but opposite volt-seconds during consecutive conduction intervals.

16. The converter of claim 15 comprising converts DC to DC voltage.

17. The converter of claim 15 comprising regulates the output voltage.

18. The converter of claim 15 comprising eliminates switching losses.

19. The converter of claim 15 comprising exhibits lower conduction losses.

20. Full bridge asymmetrical boost converter comprising:

a. Q1, input bridge transistor, operates in step with transistor Q3 at duty cycle D, and out of step with transistors Q2 and Q4; four transistors, Q1–Q4, convert Vs, a DC voltage, into a square wave AC voltage which can be transferred across the power transformer, T1; and adjusting the duty cycle, D, controls the voltage conversion ratio, Vs/Vo, so that the output voltage, Vo, can be kept constant when the input voltage changes, or so that the output voltage can be controlled for any application related requirement;

b. Q2, input bridge transistor, with the same function as transistor Q1; and operates in step with transistor Q4 at duty cycle 1−D, and out of step with transistors Q1 and Q3;

c. Q3, input bridge transistor, with the same function as Q1; and operates in step with transistor Q1 at duty cycle D, and out of step with transistors Q2 and Q4;

d. Q4, input bridge transistor, with the same function as transistor Q1; and operates in step with transistor Q2 at duty cycle 1−D, and out of step with transistors Q1 and Q3;

e. D1, freewheeling or catch diode, may be discrete component, or parasitic diode associated with transistor Q1; conducts momentarily before transistor Q1 begins its conduction interval; and provides path for commutating indirectance L1 to return its stored energy to the source;

f. D2, freewheeling or catch diode, with the same form and function as diode D1, and associated with Q2;

g. D3, freewheeling or catch diode, with the same form and function as diode D1, and associated with transistor Q3;

h. D4, freewheeling or catch diode, with same form and function as diode D1, and associated with transistor Q4;

i. D5, output rectifier, along with diode D6, rectifies AC output of power transformer T1, and passes the unidirectional and not yet pure DC voltage onto the low pass output filter, capacitors C5 and C6;

j. D6, output rectifier, along with diode D5, rectifiers AC output of power transformer T1, and passes the unidirectional, and not yet pure DC current onto the low pass output filter, capacitors C5 and C6;

k. T1, power transformer, transfers electrical energy from the input bridge, transistors Q1–Q4, to the output section, diodes D5 and D6, capacitors C5, and C6, and transformers voltage level according to turns ratio, n:1;

l. L1, commutating inductance, lumped inductance comprised of the leakage inductance of power transformer T1 and any additional inductance placed in series with the transformer's primary; provides energy to charge and discharge the required capacitances during a switching interval; and along with those capacitance, inductor L1 forms an LC resonant tank circuit, allowing the input switches, transistors Q1–Q4, to resonantly, and therefore losslessly, switch on and off;

m. L2, balance inductor, lumped inductance comprised of the magnetizing inductance of power transformer T1 and any additional inductance placed in parallel with the transformer's primary; maintains proper steady state voltage across capacitor C5 and C6, by providing a steady current which adds to the output current delivered by diode D6 to capacitor C6, and subtracting from the current delivered by diode D5 to capacitor C5; and in this way, capacitor C5 and C6 will be alternately charged and discharged by equivalent electrical charges;

n. L3, input inductor, inductive part of low pass filter which along with capacitors C5 and C6 provides smooth DC current to the output; and provides steady DC current to the input bridge, transistors Q1–Q4;

o. C1, switch capacitance, lumped capacitance comprised of all parasitic capacitance associated with transistors Q1 and diode D1, as well as any additional capacitance connected to transistor Q1; capacitors C1–C4, along with commutating inductance L1, forms an LC resonant tank circuit which allows the input switches, transistors Q1–Q4, to resonantly, and therefore losslessly, switch on and off; and it is the energy in these switch capacitances which would ordinarily be lost in a converter not achieving lossless switching;

p. C2, switch capacitance, with the same function as capacitors C1, and associated with transistor Q2 and diode D2;

q. C3, switch capacitance, with the same function as capacitor C1, and associated with transistors Q3 and D3;

r. C4, switch capacitance, with the same function as capacitor C1, and associated with transistor Q4 and diode D4;

s. C5, output capacitor, capacitive part of low pass filter providing a steady DC voltage to the output; and also, along with capacitor C6, guarantees that the power transformer, T1, will be driven by equal and opposite volt-seconds, so that transformer saturation might be avoided, by determining the voltage that will be impressed on the power transformer when the transistors Q1, Q3 pair are conducting; and, t. C6, output capacitor, capacitive part of low pass filter providing a steady DC voltage to the output; and has the same function as capacitors C5 in providing volt-second balance working with Q2, Q4 transistor pair.

* * * * *